United States Patent
Mizobe

(10) Patent No.: US 10,304,182 B2
(45) Date of Patent: May 28, 2019

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Hideaki Mizobe, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 97 days.

(21) Appl. No.: 15/240,323

(22) Filed: Aug. 18, 2016

(65) Prior Publication Data
US 2017/0061612 A1  Mar. 2, 2017

(30) Foreign Application Priority Data
Aug. 31, 2015 (JP) ................. 2015-171258

(51) Int. Cl.
*G06K 9/00* (2006.01)
*G06T 7/00* (2017.01)
(Continued)

(52) U.S. Cl.
CPC ............. *G06T 7/0012* (2013.01); *G06T 5/50* (2013.01); *G06T 11/003* (2013.01);
(Continued)

(58) Field of Classification Search
CPC ....... G06T 7/0012; G06T 5/50; G06T 11/003; G06T 11/008; G06T 15/08;
(Continued)

(56) References Cited

U.S. PATENT DOCUMENTS 5,612,985 A * 3/1997 Toki ................. A61B 5/0456
                                                            378/20
7,085,343 B2 * 8/2006 Shinno ............... A61B 6/032
                                                            378/19
(Continued)

FOREIGN PATENT DOCUMENTS

CN    103188998 A    7/2013
CN    103284746 A    9/2013
(Continued)

OTHER PUBLICATIONS

Rene W. M. Underberg, et al., "Use of Maximum Intensity Projections (MIP) For Target Volume Generation in 4DCT Scans for Lung Cancer," Intl. J. Radiation Oncology Biol. Phys. vol. 63, No. 1 pp. 253-260 (2005).
(Continued)

*Primary Examiner* — Shefali D Goradia
(74) *Attorney, Agent, or Firm* — Canon U.S.A., Inc. IP Division

(57) ABSTRACT

A plurality of projection images are obtained, on a basis of plural pieces of three-dimensional image data obtained by imaging an object at a plurality of different time points, by projection from a plurality of different projection directions corresponding to projection images in accordance with a three-dimensional partial region where a pixel value is increased and a three-dimensional partial region where the pixel value is decreased at a second time point with respect to a first time point among the plurality of time points, and the plurality of projection images are displayed on a display unit.

16 Claims, 9 Drawing Sheets

(51) Int. Cl.
*G06T 5/50* (2006.01)
*G06T 11/00* (2006.01)
*G06T 15/08* (2011.01)

(52) U.S. Cl.
CPC ............ *G06T 11/008* (2013.01); *G06T 15/08* (2013.01); *G06T 2200/04* (2013.01); *G06T 2207/10072* (2013.01); *G06T 2207/10081* (2013.01); *G06T 2207/20212* (2013.01); *G06T 2207/20224* (2013.01); *G06T 2207/30004* (2013.01)

(58) Field of Classification Search
CPC ....... G06T 2200/04; G06T 2207/10072; G06T 2207/10081; G06T 2207/20212; G06T 2207/20224; G06T 2207/30004
See application file for complete search history.

(56) References Cited

U.S. PATENT DOCUMENTS

| | | | | |
|---|---|---|---|---|
| 7,653,263 | B2 * | 1/2010 | Wheeler | G06T 7/001 382/294 |
| 9,414,799 | B2 * | 8/2016 | Mistretta | A61B 6/032 |
| 2002/0118868 | A1 | 8/2002 | Okada | |
| 2008/0081987 | A1 * | 4/2008 | Miyazaki | A61B 5/055 600/410 |
| 2011/0245660 | A1 * | 10/2011 | Miyamoto | A61B 6/032 600/424 |
| 2015/0042643 | A1 * | 2/2015 | Shibata | A61B 6/022 345/419 |

FOREIGN PATENT DOCUMENTS

| | | |
|---|---|---|
| EP | 1923836 A1 | 5/2008 |
| EP | 2712551 A1 | 4/2014 |
| JP | H08147496 A | 6/1996 |
| JP | 2007125240 A | 5/2007 |
| WO | 2011/042833 A1 | 4/2011 |
| WO | 2015029135 A1 | 3/2015 |

OTHER PUBLICATIONS

Jin Liu, et al., "Use of Combined Maximum and Minimum Intensity Projections to Determine Internal Target Volume in 4-Dimensional CT Scans for Hepatic Malignancies, Radiation Oncology 2012, 7:11," http://www.ro-journal.com/content/7/1/11, (2012).

* cited by examiner

FIG. 4

| 1 | 2 | 3 |
|---|---|---|
| 1 | 2 | 3 |
| 1 | 2 | 3 |

−

| 1 | 1 | 1 |
|---|---|---|
| 2 | 2 | 2 |
| 3 | 3 | 3 |

=

| 0 | 1 | 2 |
|---|---|---|
| −1 | 0 | 1 |
| −2 | −1 | 0 |

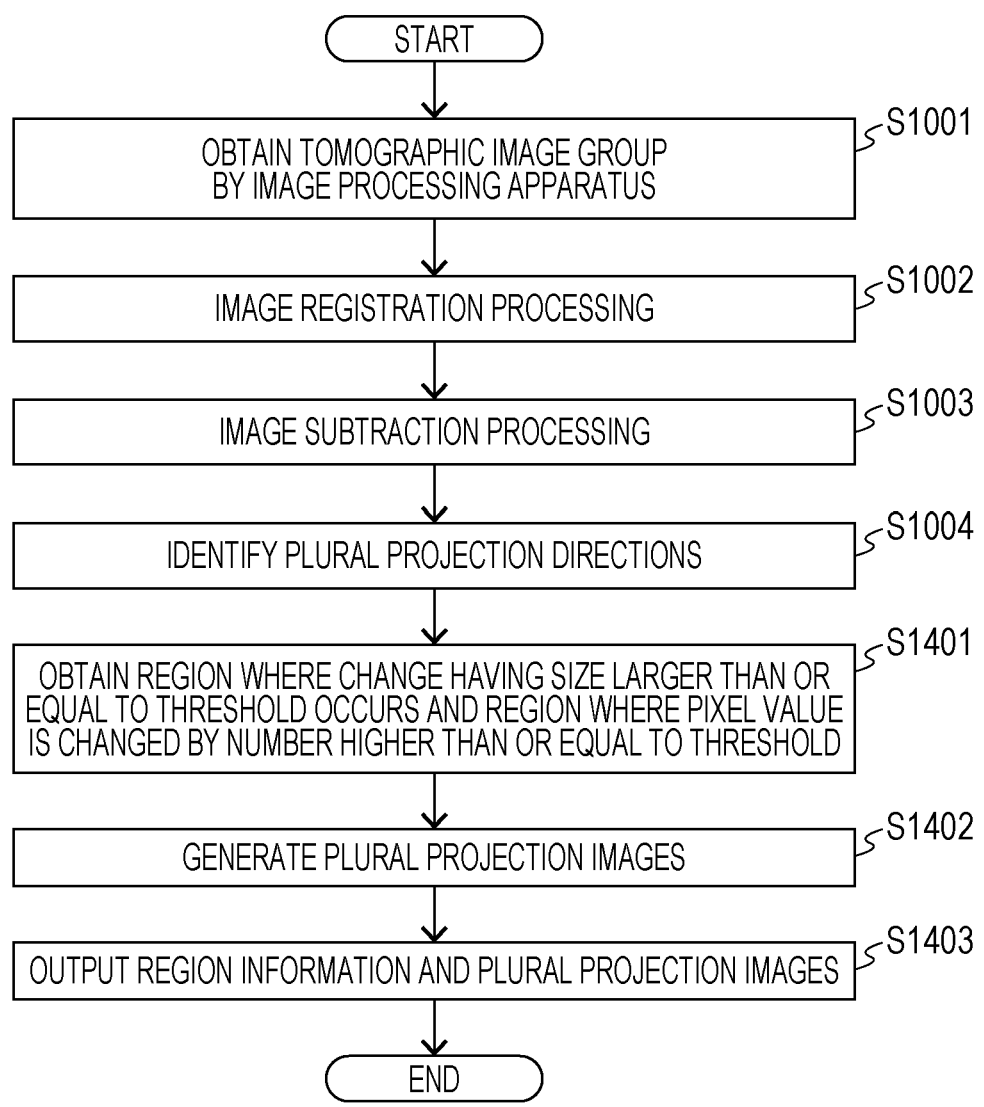

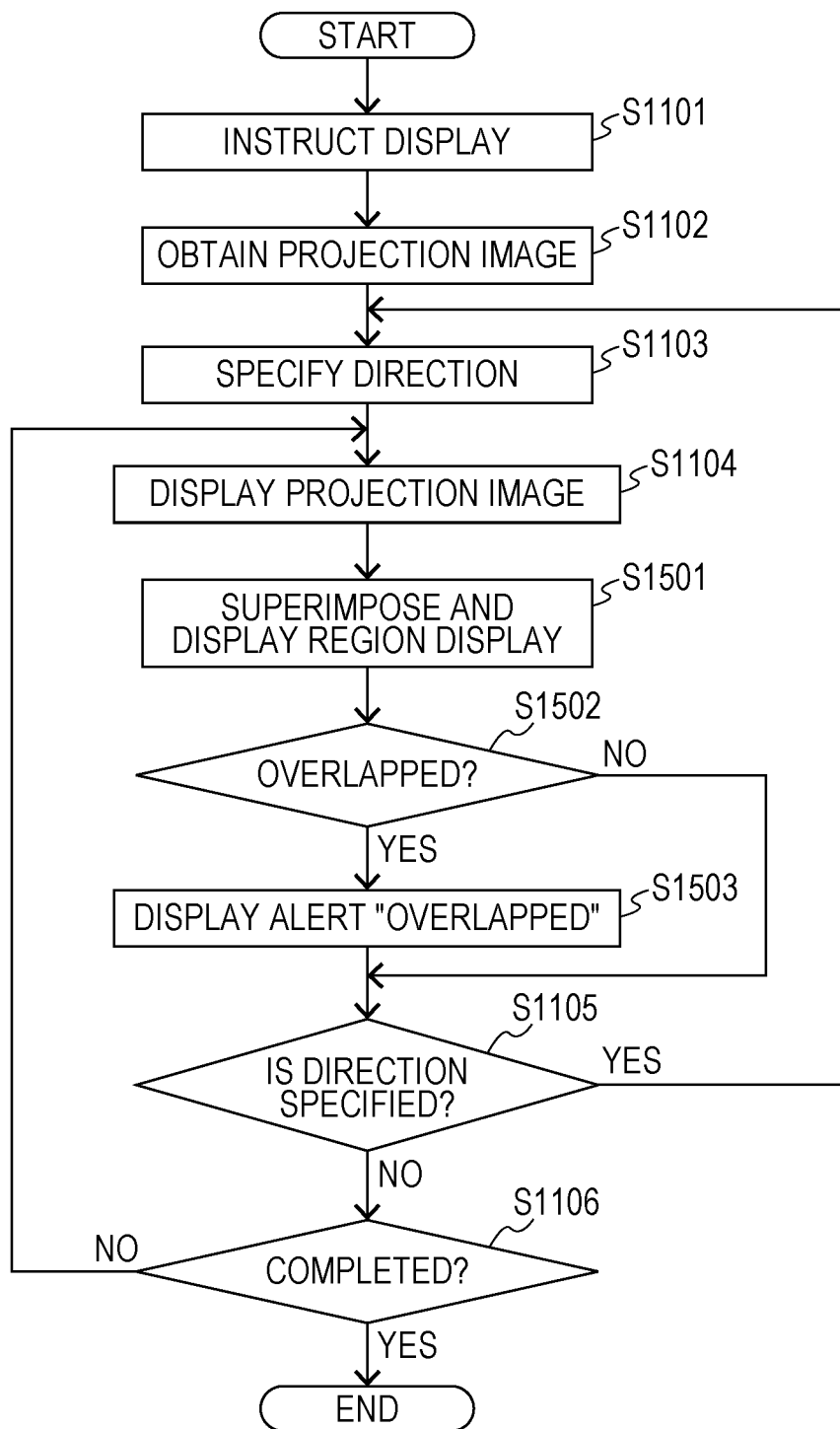

INFORMATION PROCESSING APPARATUS, INFORMATION PROCESSING METHOD, AND RECORDING MEDIUM

BACKGROUND OF THE INVENTION

Field of the Invention

The present invention relates to an information processing apparatus, an information processing method, and a recording medium.

Description of the Related Art

When a doctor conducts a medical examination by using a medical image, to find a lesion site or carry out a follow-up, the doctor may observe a plurality of medical images obtained by imaging the same region at a plurality of time points. In this case, to emphasize a region where a clinical condition is changed, an image representing a difference between two three-dimensional images captured at different time points, that is, a temporal subtraction image may be created.

While projection processing is carried out to perform a projection from a certain direction with respect to the temporal subtraction image corresponding to a three-dimensional image, it becomes easier to grasp the region where the change has occurred. At the same time, in the projection processing, the regions where the change has occurred may be overlapped with each other on the projection direction in some cases.

As a technique for producing a differential image, US2002/0118868 discusses a technique for producing a differential image by subtracting one image from another image.

SUMMARY OF THE INVENTION

According to some embodiments of the present invention, there is provided an information processing apparatus including: an obtaining unit configured to obtain, on a basis of plural pieces of three-dimensional image data obtained by imaging an object at a plurality of different time points, a plurality of projection images obtained by projection from a plurality of different projection directions corresponding to projection images in accordance with a three-dimensional partial region where the pixel value is increased and a three-dimensional partial region where the pixel value is decreased at a second time point with respect to a first time point among the plurality of time points; and a display control unit configured to display the plurality of projection images on a display unit.

Further features of the present invention will become apparent from the following description of exemplary embodiments with reference to the attached drawings.

BRIEF DESCRIPTION OF THE DRAWINGS

FIG. 4 illustrates an example of differential processing according to the first exemplary embodiment.

FIG. 5 illustrates an example of the differential processing according to the first exemplary embodiment.

FIG. 6 illustrates an example of the differential processing according to the first exemplary embodiment.

FIG. 14 is a flow chart illustrating an example of the processing performed by the image processing apparatus according to a second exemplary embodiment.

FIG. 15 is a flow chart illustrating an example of the processing performed by the information processing apparatus according to the second exemplary embodiment.

DESCRIPTION OF THE EMBODIMENTS

Hereinafter, exemplary embodiments of the present invention will be described with reference to the drawings. Each of the embodiments of the present invention described below can be implemented solely or as a combination of a plurality of the embodiments or features thereof where necessary or where the combination of elements or features from individual embodiments in a single embodiment is beneficial.

First Exemplary Embodiment

An information processing apparatus according to a first exemplary embodiment of the present invention obtains projection images projected from a plurality of directions with regard to a temporal subtraction image, based on plural pieces of three-dimensional image data obtained by imaging an object at a plurality of different time points, and displays the projection images on a display unit.

Figure 1:
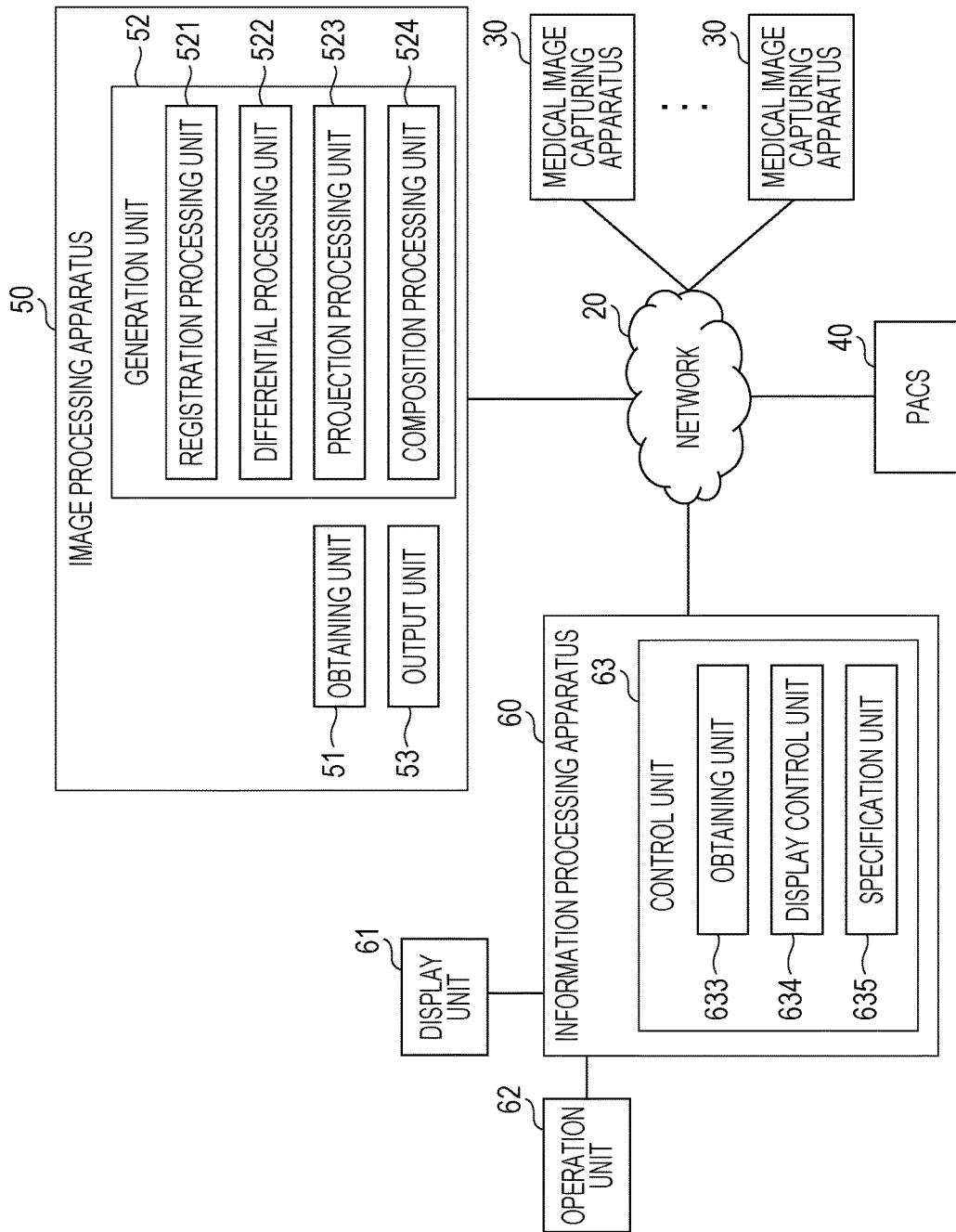
FIG. 1 illustrates an example of a system including an information processing apparatus according to a first exemplary embodiment.

FIG. 1 illustrates a system including the information processing apparatus according to the first exemplary embodiment. This system includes medical image capturing apparatuses 30, a PACS 40, an image processing apparatus 50, and an information processing apparatus 60, which are connected to one another via a network 20.

The network 20 connects the respective apparatuses included in this system to one another. The network 20 is, for example, a local area network (LAN). The network 20 is constituted, for example, by a device such as a repeater, a hub, a bridge, or a router and a line such as the internet.

The medical image capturing apparatus 30 is an apparatus configured to capture a medical image used for a diagnosis. For example, the medical image capturing apparatus 30 is a magnetic resonance imaging (MRI) apparatus, an X-ray computed tomography (CT) imaging apparatus, or a positron-emission tomography (PET) imaging apparatus. A plurality of medical image capturing apparatuses 30 may be included in the system.

The PACS 40 refers to a picture archiving and communication system. The PACS 40 receives and saves the image captured by the medical image capturing apparatus 30 and transmits the image to the respective apparatuses in accordance with requests of the connected apparatuses. In addition, the PACS 40 is provided with a data base that can save various data associated with the image together with the received image.

The image processing apparatus 50 is an apparatus configured to perform image processing according to the first exemplary embodiment. The image processing apparatus 50 is, for example, an image processing work station configured to process the medical image. The image processing apparatus 50 includes an obtaining unit 51, a generation unit 52, and an output unit 53. The obtaining unit 51 obtains an image on which the image processing is performed in the image processing apparatus 50. The obtaining unit 51 obtains the image from the medical image capturing apparatus 30 or the PACS 40 via the network 20. The generation unit 52 performs the image processing according to the first exemplary embodiment. The generation unit 52 includes a registration processing unit 521, a differential processing unit 522, a projection processing unit 523, and a composition processing unit 524. The registration processing unit 521 performs processing of matching positions of the objects included in the plural pieces of three-dimensional image data obtained by imaging the object at the plurality of different time points to each other. The differential processing unit 522 performs processing of obtaining a difference between the three-dimensional image data in which the positions of the objects are matched to each other by the registration processing unit 521. As a result, the temporal subtraction image based on the plural pieces of three-dimensional image data obtained by imaging the object at the plurality of different time points is obtained. The projection processing unit 523 obtains a projection image obtained by performing a projection from a certain direction with respect to the temporal subtraction image obtained by the differential processing unit 522. The projection processing unit 523 can obtain a plurality of projection images obtained by performing the projection from a plurality of different projection directions with respect to one temporal subtraction image. The projection processing unit 523 can perform, for example, maximum value projection processing and minimum value projection processing. The composition processing unit 524 performs processing of combining the plurality of projection images obtained by the projection processing unit 523 to each other. The output unit 53 outputs the plurality of projection images to the outside to be displayed on a display unit. For example, the output unit 53 outputs the composition image obtained by the composition processing unit 524. The output unit 53 may also output the temporal subtraction image generated by the differential processing unit 522 to the outside. Detailed descriptions of the image processing according to the first exemplary embodiment will be given below.

The information processing apparatus 60 is an apparatus configured to perform information processing according to the first exemplary embodiment. The information processing apparatus 60 is, for example, an electronic computer. A display unit 61 and an operation unit 62 may be connected to the information processing apparatus 60. The display unit 61 is, for example, a liquid crystal monitor. The operation unit 62 is, for example, a key board or a mouse. The display unit 61 and the operation unit 62 may be integrated with a touch panel monitor.

The information processing apparatus 60 includes a control unit 63. The control unit 63 controls the respective apparatuses connected to the information processing apparatus 60 and the information processing apparatus 60 in an integral manner. The control unit 63 includes an obtaining unit 633, a display control unit 634, and a specification unit 635. The obtaining unit 633 obtains the image displayed on the display unit 61. The obtaining unit 633 obtains the image from the medical image capturing apparatus 30, the PACS 40, and the image processing apparatus 50 via the network 20. The display control unit 634 controls a screen displayed on the display unit 61. For example, the obtaining unit 633 obtains the plurality of projection images obtained by the projection processing unit 523. The display control unit 634 displays the plurality of projection images obtained by the obtaining unit 633 on the display unit 61. The specification unit 635 specifies a projection direction of the projection processing performed by the projection processing unit 523. For example, the specification unit 635 specifies the projection direction on the basis of an operation input of a user via the operation unit 62. The processing performed by the information processing apparatus 60 will be described below.

Figure 2:
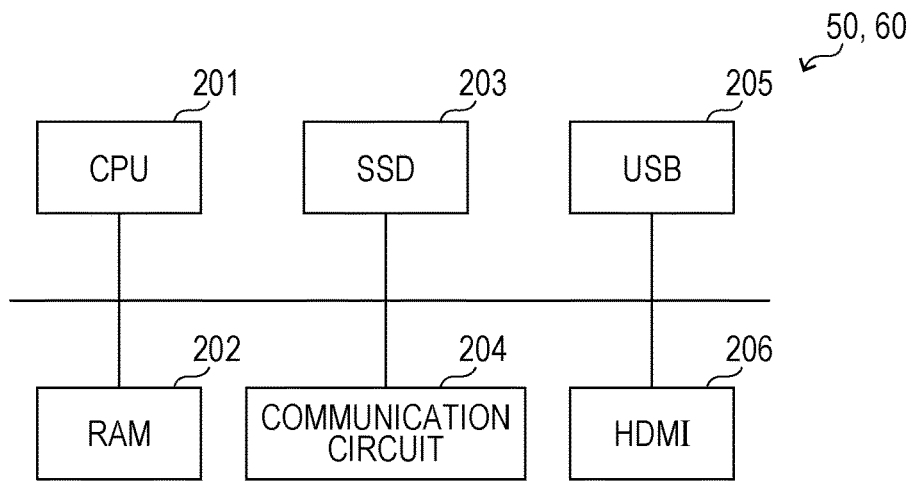
FIG. 2 illustrates an example of a hardware configuration of an image processing apparatus and the information processing apparatus according to the first exemplary embodiment.

FIG. 2 illustrates an example of a hardware configuration of the image processing apparatus 50 and the information processing apparatus 60. The image processing apparatus 50 and the information processing apparatus 60 include a central processing unit (CPU) 201, a random access memory (RAM) 202, a solid state drive (SSD) 203, a communication circuit 204, Universal Serial Bus (USB) 205, and High Definition Multimedia Interface (HDMI) (registered trademark) 206. The CPU 201 temporarily saves the program saved in the SSD 203 in the RAM 202. Furthermore, the CPU 201 executes the program temporarily saved in the RAM 202 to control the apparatuses in an integral manner. The CPU 201 controls display of the display unit 61. The RAM 202 is a primary storage device. The SSD 203 saves a program used for operating the image processing apparatus 50 or the information processing apparatus 60. The SSD 203 may be, for example, another storage medium such as a flash memory. In addition, the SSD 203 saves data. The communication circuit 204 is a circuit connected to the network 20 to perform communications with the respective apparatuses included in the system. The USB 205 and the HDMI (registered trademark) 206 are connection units. The USB 205 of the information processing apparatus 60 is connected to the operation unit 62. The HDMI (registered trademark) 206 of the information processing apparatus 60 is connected to the display unit 61.

Hereinafter, descriptions will be given of an example in which a tomographic image obtained by the medical image capturing apparatus 30 is used as the three-dimensional image data according to the first exemplary embodiment. A specific example of the tomographic image includes an MR image obtained by the MRI apparatus, a CT image obtained by the CT imaging apparatus, or a PET image obtained by the PET imaging apparatus. It should be noted that several different capturing methods are proposed for the MR image. For example, it is possible to obtain tomographic images having different features such as a T1-weighted image, a T2-weighted image, and a diffusion-weighted image. The tomographic image is constituted by one or more tomographic plane images corresponding to two-dimensional images. While the tomographic plane images at different capturing positions are laminated on each other, an object such as a human body is three-dimensionally represented.

When a doctor conducts a diagnosis on whether or not an abnormality of a patient exists by observing the tomographic images, while an apparatus that displays a tomographic plane image group constituting the tomographic images is used, an operation of searching for the abnormality is performed by switching the tomographic plane image to be displayed one by one. Since the tomographic images three-dimensionally represent the object by laminating the tomographic plane images corresponding to the two-dimensional images on each other, it is possible to identify coordinates of an arbitrary pixel by a three-dimensional Cartesian coordinate system. Specifically, the pixel is identified by coordinates (X, Y, Z) indicating the X-th pixel in the horizontal direction and the Y-th pixel in the vertical direction of the Z-th tomographic plane image constituting the tomographic image. When a lesion found by the doctor observing the tomographic image is represented, for example, "the lesion is present at the coordinates (X, Y, Z)" is recorded. In addition, an anatomical region such as a lesion region or a "cerebrum region" can be identified by a pixel group corresponding to a coordinate group of the tomographic image.

Next, image processing performed by the registration processing unit 521 will be described. The registration processing unit 521 performs image registration processing. The image registration processing refers to processing of deforming one or both of images such that the objects in the two different images are matched to each other as much as possible. The doctor visually compares a tomographic image of a certain patient with a tomographic image captured before the above-described tomographic image and observes the tomographic images to determine whether or not a concerning change occurs. At this time, even in the case of the tomographic images captured by the same medical image capturing apparatus 30, if an orientation of the patient at the time of the capturing is varied, it may be difficult to compare the tomographic plane images with each other in some cases. The image registration processing is performed on the newly captured tomographic image, and one or both of the tomographic images are deformed to set shapes of the tomographic plane images to be similar to each other when the same site is observed, so that the observation is facilitated. In a case where both the tomographic images are deformed, for example, the deformation processing is performed on the basis of a reference tomographic image including the same imaging target corresponding to a reference apart from the two tomographic images. That is, the two tomographic images are deformed such that each of the two tomographic images is matched to the reference tomographic image as much as possible.

In the deformation processing using the reference tomographic image, it is possible to reduce the number of times to perform the processing when the deformation is performed to match the plurality of tomographic images to each other. For example, in a case where the deformation is performed to match two arbitrary tomographic images out of four tomographic images to be matched with each other as much as possible, maximum of six combinations exist. In a case where the registration of all the tomographic images is performed on the basis of a method of deforming one of the tomographic images, the image registration processing needs to be performed six times. In a case where the registration of all the tomographic images is performed on the basis of a method of using the reference tomographic image, it is sufficient that the image registration processing is performed four times. Furthermore, in the method of using the reference tomographic image, a user can start the observation from the tomographic image on which the image registration processing has been performed, and it is possible to reduce waiting time.

In the image registration processing, deformation information for controlling the deformation of the tomographic image is generated. Then, the tomographic image is deformed in accordance with the deformation information. The deformation information refers to information for moving a pixel at certain coordinates. While the respective pixels constituting the tomographic image are moved in accordance with the deformation information, the tomographic image after the deformation is obtained. In a case where a pixel that is not included in the deformation information exists, a pixel in which a pixel value is not set is generated in the tomographic image after the deformation. In this case, with respect to the pixel in which the pixel value is not set, the pixel value can be set by a pixel value interpolation method such as a linear interpolation on the basis of a value and a position of the other pixel in which the pixel value is set.

The registration processing unit 521 performs, for example, processing based on a non-rigid registration. Herein, descriptions will be given of image registration processing using an algorithm called a large deformation diffeomorphic metric mapping (LDDMM) (Miller, et al., 1993, Proceedings of the National Academy of Sciences of the United States of America, 90, 1 194-1 1948; Joshi et al., 1995, Geometric methods in Applied Imaging, San Diego, Calif.; Granander and Miller, 1996, Statistical computing and graphics newsletter 7, 3-8) as an example.

For example, the image registration processing of a first tomographic image $I(\chi)$ and a second tomographic image $J(\chi)$ is performed. Herein, $\chi$ denotes a position vector represented by three-dimensional coordinates (x, y, z) and is equivalent to a voxel constituting respective lattice points in the three-dimensional image. $\chi=(x, y, z)T$ is established, and T represents a transposition. In each of the first tomographic image $I(\chi)$ and the second tomographic image $J(\chi)$, a family of sets $\Gamma$ of points corresponding to an imaging target in the tomographic image=$\{\gamma 1, \gamma 2, \gamma 3, \ldots, \gamma n\}$ is defined. The imaging target in the tomographic image is, for example, a particular anatomical structure of the object.

It is assumed that, if the registration of the imaging targets of the first tomographic image $I(\chi)$ and the second tomographic image $J(\chi)$ is accurately realized, a pixel group $\gamma$ ($\gamma$ belongs to $\Gamma$) corresponding to the imaging target included in each of the tomographic image groups appears at each of density values i and j with a joint probability $P(i, j|\gamma)$ in $I(\chi)$ and $J(\chi)$. That is, a probability variable I or J, in which the density value of the pixel group $\gamma$ corresponding to the imaging target included in each of the first tomographic image $I(\chi)$ and the second tomographic image $J(\chi)$ is set as each of the sample values, is set in each of the tomographic images. Then, it is assumed that a multi-dimensional probability vector constituted by a set of the probability variables of the respective tomographic images, herein, a two-dimensional probability vector (I, J) follows a predetermined joint distribution $(I(\chi), J(\chi)|\gamma)$.

Next, the first tomographic image $I(\chi)$ and the second tomographic image $J(\chi)$ on which the registration has not been realized, that is, the image registration processing has not been performed will be examined. A non-rigid registration transformation for registering a first pixel group constituting the second tomographic image $J(\chi)$ with a second pixel group constituting the first tomographic image $I(\chi)$ will be represented as $T(\chi)$. If the first pixel group and the second pixel group are appropriately associated with the first tomographic image $I(\chi)$ and the second tomographic image $J(\chi)$ through this transformation $T(\chi)$, it is assumed that a two-dimensional vector (i, j) in which the respective density values are set as a pair in the first pixel group and the second pixel group follows the above-described joint distribution. A likelihood function indicating a likelihood that the two-dimensional vector (i, j) is observed is defined by Expression 1 and Expression 2.

$$P(I, J \mid T) = \prod_{\chi \in I} P(I(\chi), J(T(\chi))) \qquad (1)$$

$$= \prod_{\chi \in I} \sum_{\gamma \in \Gamma} P(\gamma) \cdot P(I(\chi), J(T(\chi)) \mid \gamma)$$

$$\sum_{\gamma \in \Gamma} P(\gamma) = 1 \qquad (2)$$

It should be noted that the likelihood function of the above-described format is generally used in a likelihood analysis method, in particular, a maximum likelihood estimation method in the field of statistical analysis. In general, in the maximum likelihood estimation method, an average, a covariance, and the like in a population distribution are set to be undefined, and these are incorporated in the likelihood function as population parameters to obtain a maximum likelihood estimator. According to the first exemplary embodiment, the population distribution is previously estimated, and a parameter φ of the non-rigid registration transformation T(χ) is incorporated in the likelihood function as a population parameter to obtain the maximum likelihood estimator. The parameter φ will be described below. It should be noted that the maximum likelihood estimation method can also be applied to the previously estimated population distribution.

The family of sets Γ of the anatomical structure corresponding to the imaging target in the tomographic image is constituted by two tissues, that is, target tissues corresponding to registration targets and the other surrounding tissues. Expression 1 and Expression 2 are transformed as follows.

$$P(I, J) = \prod_{\chi \in I} (P(L) \cdot P(I(\chi), J(T(\chi)) \mid L) + P(O) \cdot P(I(\chi), J(T(\chi)) \mid O)) \qquad (3)$$

In addition, a maximum logarithm likelihood transformation $T_{ML}$ is defined by Expression 4.

$$T_{ML} = \arg_T \max \sum_{\chi} \log(P(I(\chi), J(T(\chi)))) \qquad (4)$$

The likelihood function in Expression 4 is incorporated as a scale of a similarity in an image registration evaluation function (objective function) as defined by Expression 5.

$$C(\Phi) = \sum_{\chi} \{-C_{similarity}(\phi) + \lambda C_{smooth}(\phi)\} \qquad (5)$$

Where $C_{similarity}(\varphi)$ denotes a similarity scale term defined as the above-described likelihood. $C_{smooth}(\varphi)$ denotes a smooth restriction term. λ denotes a weighting parameter to take a balance of the two terms. $C_{similarity}(\varphi)$ and $C_{smooth}(\varphi)$ respectively denote the similarity scale term and the smooth restriction term in the respective localized regions and are provided by Expression 6 and Expression 7.

$$C_{similarity}(\phi) = \sum_{\chi \in V} \log(P(I(\chi), J(\chi + \delta(\chi; \phi)))) \qquad (6)$$

$$C_{smooth}(\phi) = \qquad (7)$$
$$\left(\frac{\partial^2 \phi}{\partial x^2}\right)^2 + \left(\frac{\partial^2 \phi}{\partial y^2}\right)^2 + \left(\frac{\partial^2 \phi}{\partial z^2}\right)^2 + 2\left(\frac{\partial^2 \phi}{\partial xy}\right)^2 + 2\left(\frac{\partial^2 \phi}{\partial xz}\right)^2 + 2\left(\frac{\partial^2 \phi}{\partial yz}\right)^2$$

V denotes a localized region related to φ. Φ denotes a parameter for describing a registration transformation provided by Expression 8.

$$T(\chi) = \chi + \delta(\chi; \Phi) \qquad (8)$$

δ(x; Φ) represents a deformation (FFD) of a free-form curved surface described by B-spline (curved surface). Φ represents a whole set of B-spline control points. φ belongs to Φ and represents a subset of control points related to the respective localized regions.

Figure 3:
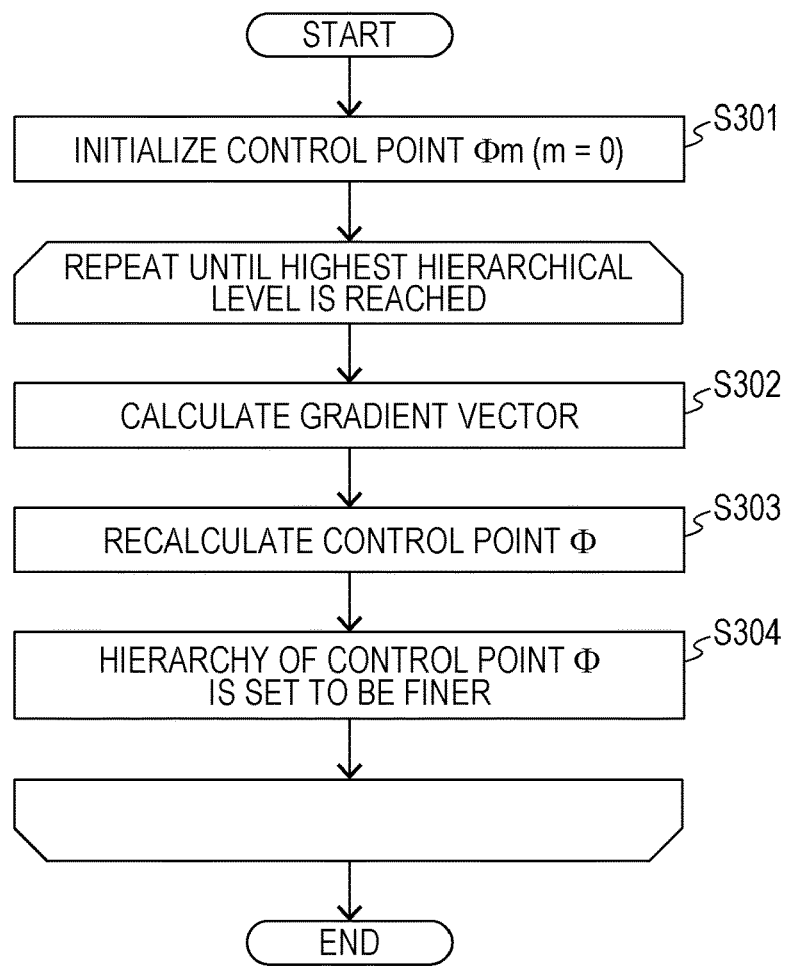
FIG. 3 is a flow chart illustrating an example of processing included in registration processing according to the first exemplary embodiment.

To minimize the registration evaluation function defined in Expression 5, for example, a steepest descent algorithm using a hierarchical grid which will be illustrated below is used. FIG. 3 is a flow chart for exemplifying processing included in the registration processing performed by the registration processing unit 521. The processing based on the steepest descent algorithm will be described with reference to FIG. 3.

In step S301, a control point $\Phi^m$ (m=0) is initialized. That is, an initial value of Φ in the above-described processing is set.

In step S302, a gradient vector in Expression 5 is obtained on the basis of Expression 9.

$$\nabla C = \frac{\partial C(\Phi^T)}{\partial \Phi^T} \qquad (9)$$

In step S303, the control point Φ is updated in a range of $\|\nabla C\| > \epsilon$ (ε is a small positive number) on the basis of Expression 10, and a gradient vector ∇C is obtained again. As a result, the control point Φ is updated.

$$\Phi^{m+1} = \Phi^m + \mu \frac{\nabla C}{\|\nabla C\|} \qquad (10)$$

In step S304, the hierarchy of the control point Φ is set to be finer. The flow proceeds to step S302 on the basis of $\Phi^{m+1}$ obtained from Expression 10, and the above-described processing is repeated. It should be noted however that $\Phi^m$ represents a B-spline control point grid at the m-th hierarchical level.

The above-described processing from step S302 to step S304 is repeated until the highest hierarchical level is reached, and the processing is completed. A time point when the highest hierarchical level is reached is when Φ converges. As an alternative to the above, the processing may be completed after the processing is repeated a predetermined number of times.

It should be noted that the B-spline is used as the modeling method to represent the free-form curved surface in the above-described example, but a Bezier method or other modeling methods may be used. In addition, the steepest descent method is used as the algorithm to minimize the registration evaluation function in the above-described example, but an optimization method such as a conjugate gradient method, a Newton-Raphson method, a quasi-Newton method, or a Levenberg-Marquardt Method may be used.

Figures 4, 5, 6:
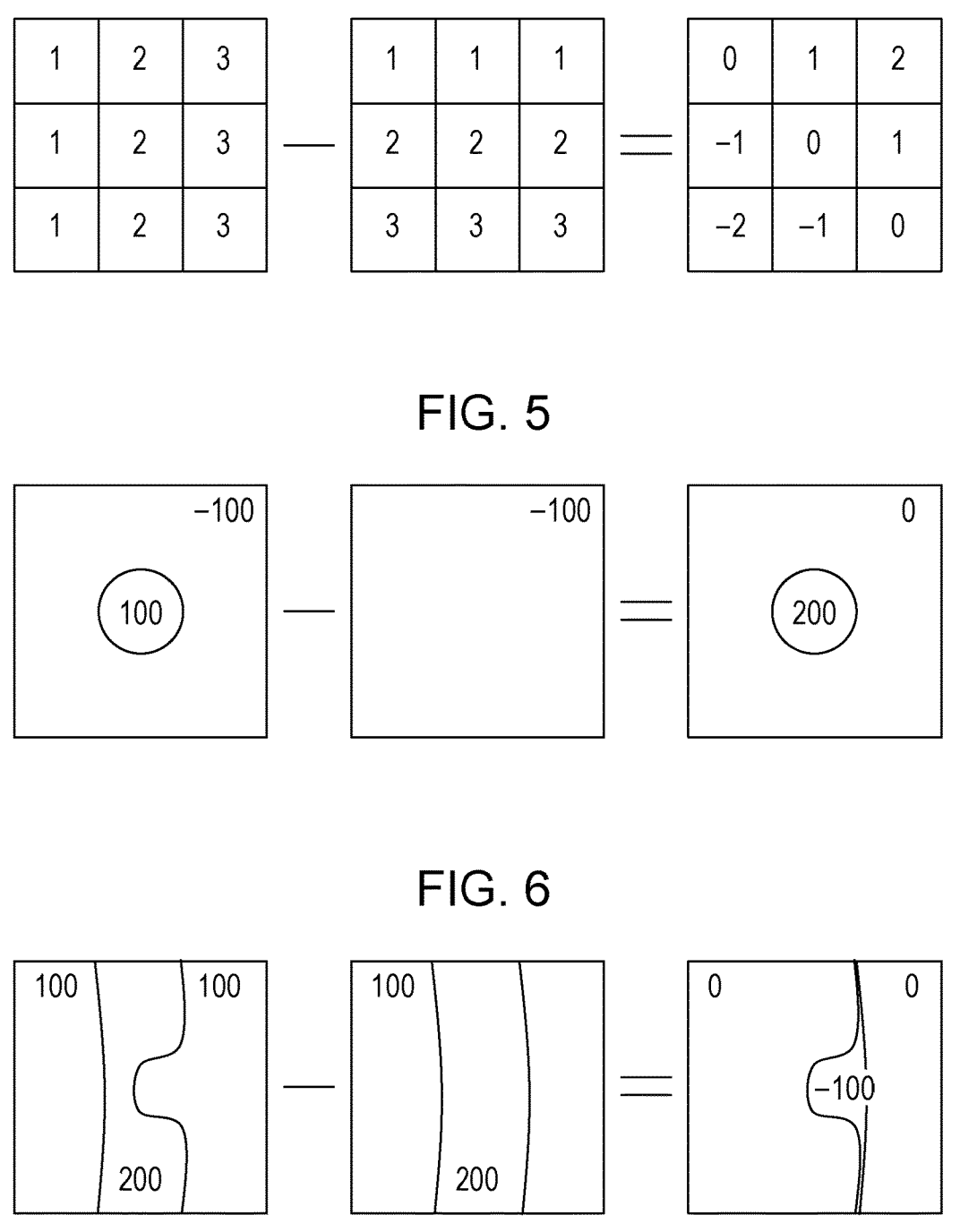

Next, image subtraction processing in the image processing according to the first exemplary embodiment will be described. As illustrated in FIG. 4, the image subtraction processing refers to processing of subtracting pixel values from each other in the mutual pixels having the corresponding position relationship in the two tomographic image groups to obtain a subtraction image. For example, the image subtraction processing is performed by using the two tomographic image groups that have the same imaging target and are captured at different times. As a result, a subtraction tomographic image corresponding to an emphasized image in which a difference between the two tomographic images captured at the different times, that is, a change is depicted, is obtained. The above-described subtraction tomographic image is referred to as a temporal subtraction image or a temporal subtraction tomographic image. It should be noted that, in the image subtraction processing according to the first exemplary embodiment, unless particularly mentioned, the pixel value group constituting the tomographic image having an older capturing time is subtracted from the pixel value group constituting the tomographic image having a newer capturing time.

In addition, in the tomographic image groups captured at the different times, the position of the imaging target may be shifted in the respective tomographic images in some cases. Therefore, even in the case of the tomographic image group captured by the same medical image capturing apparatus 30 and obtained on the basis of the same parameter setting, the temporal subtraction tomographic image in which only the part where the change occurs is depicted may not be obtained in some cases by only subtracting the mutual pixels at the same coordinates from each other. For this reason, in a case where the image subtraction processing is performed with respect to the tomographic image groups captured at the different times, in order that the position relationship of the imaging targets is matched in the tomographic image groups, the above-described image registration processing is performed before the image subtraction processing.

As a specific example, a case where two temporal subtraction tomographic images as illustrated in FIG. 5 are obtained will be described. A first term on a left-hand side is a first CT image of a certain object, and the imaging target is a lung. The first CT image illustrates a region of an isolated lung cancer surrounded by an alveolar region. A second term on the left-hand side is a second CT image captured before the time when the first CT image is captured, and the imaging target is the lung. The temporal subtraction tomographic image is obtained by subtracting the second CT image from the first CT image. For simplicity, part where the change occurs is only a lung cancer region in the first CT image and the second CT image.

First, the second CT image is deformed through the image registration processing such that lung regions in the first CT image and the second CT image are matched with each other. Next, the first CT image and the deformed second CT image are subjected to the image subtraction processing to obtain the temporal subtraction tomographic image. As a result, an image in which only the lung cancer region where the change occurs in the temporal subtraction tomographic image has a positive pixel value, and a pixel value of the other region is 0 is obtained. In general, the lung cancer region has a higher X-ray absorption rate than that of the surrounding alveolar region in the CT imaging. For this reason, it is represented in the CT image that the pixel value of the lung cancer region is high, and the pixel value of the alveolar region is low, for example. The region having the low pixel value where the lung cancer does not exist in the second CT image is subtracted from the region having the high pixel value where the lung cancer exists in the first CT image. Therefore, only the region where the lung cancer exists is depicted to have the positive value in the temporal subtraction tomographic image illustrated in the right side of FIG. 5. Since it is assumed that parts other than the lung cancer region have no change, and the pixel values thereof are matched to each other in the example illustrated in FIG. 5, the subtraction result of the mutual pixel values of the parts other than the lung cancer region is depicted as 0.

FIG. 6 illustrates another example of the temporal subtraction tomographic image. The first term on the left-hand side of FIG. 6 is the first CT image representing a state in which part of the bone is dissolved by an osteolytic cancer of the patient corresponding to the object. The second term on the left-hand side of FIG. 6 is the second CT image representing a state before the bone is dissolved which is captured before the first CT image. Similarly as in the above-described example, the second CT image is subtracted from the first CT image to obtain the temporal subtraction tomographic image as illustrated in the right side of FIG. 6. In the CT imaging, the bone region has a higher X-ray absorption rate than that of the region where the bone is dissolved. For this reason, it is represented in the CT image that the pixel value of the bone region is high, and the pixel value of the region where the bone is dissolved is low, for example. Therefore, in the temporal subtraction tomographic image, a region where the bone is dissolved and disappears is represented as a negative value where the pixel value is particularly low.

While the newly captured first tomographic image and the previously captured second tomographic image are regarded as the targets, features of the temporal subtraction tomographic image obtained by the image subtraction processing are summarized from the above-described specific example. When the region having the higher pixel value than that of the second tomographic image exists in the first tomographic image, this region is depicted as the region having the high pixel value (positive value) in the temporal subtraction tomographic image. On the other hand, when the region having the lower pixel value than that of the second tomographic image exists in the first tomographic image, this region is depicted as the region having the low pixel value (negative value) in the temporal subtraction tomographic image.

Next, projection processing in the image processing according to the first exemplary embodiment will be described. The projection processing is processing of generating a projection image corresponding to a two-dimensional image from the tomographic image corresponding to the three-dimensional image. The projection image includes, for example, a maximum intensity projection (MIP) image, a minimum intensity projection (MinIP) image, a volume rendering image, a surface rendering image, or the like. The MIP image is a maximum value projection image obtained by the maximum value projection processing. The maximum value projection processing is processing of displaying a maximum value in a projection path in an arbitrary view direction of the three-dimensional image on a project plane. The MinIP image is a minimum value projection image obtained by the minimum value projection processing. The minimum value projection processing is processing of displaying a minimum value in the projection path in the arbitrary view direction of the three-dimensional image on the project plane.

Figure 7:
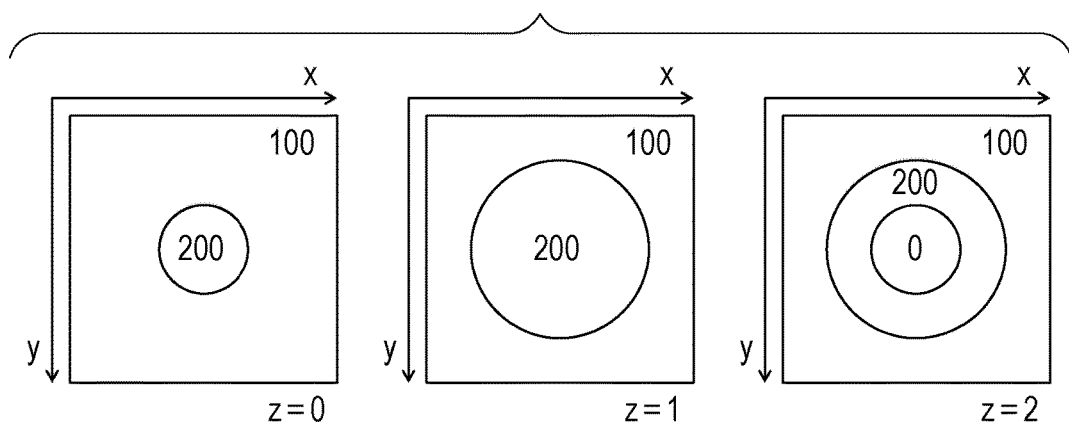
FIG. 7 illustrates an example of projection processing according to the first exemplary embodiment.
Figure 8:
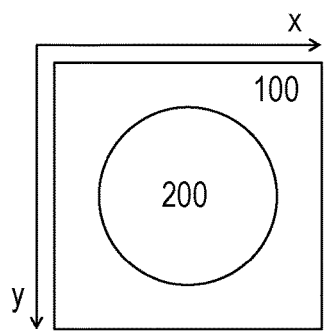
FIG. 8 illustrates an example of the projection processing according to the first exemplary embodiment.
Figure 9:
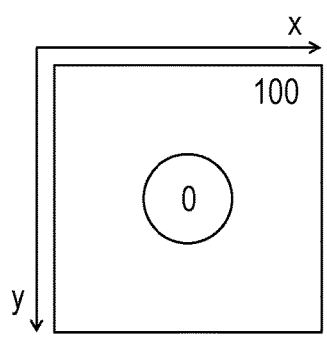
FIG. 9 illustrates an example of the projection processing according to the first exemplary embodiment.

In particular, since the MIP image generated from the temporal subtraction tomographic image depicts the maximum pixel value in the view direction, it is effective to depict a region where the pixel value becomes higher than that of a previous tomographic image. For example, it is effective in a case where a lung cancer region or an osteoblastic cancer (cancer that causes the bone to be hardened) region newly appears, or the like. In the tomographic image constituted by the tomographic plane image group illustrated in FIG. 7, when the MIP image is generated in a case where a view direction vector is set as (0, 0, 1), a two-dimensional image as illustrated in FIG. 8 is obtained. In addition, since the MinIP image generated from the temporal subtraction tomographic image depicts the minimum pixel value in the view direction, it is effective to depict a region where the pixel value becomes lower than that of the previous tomographic image. For example, it is effective in a case where the osteolytic cancer or a crack or peeling region such as a bone fracture newly appears or the like. In the tomographic image constituted by the tomographic plane image group illustrated in FIG. 7, when the MinIP image is generated in a case where the view direction vector is set as (0, 0, 1), the two-dimensional image as illustrated in FIG. 9 is obtained.

Figure 10:
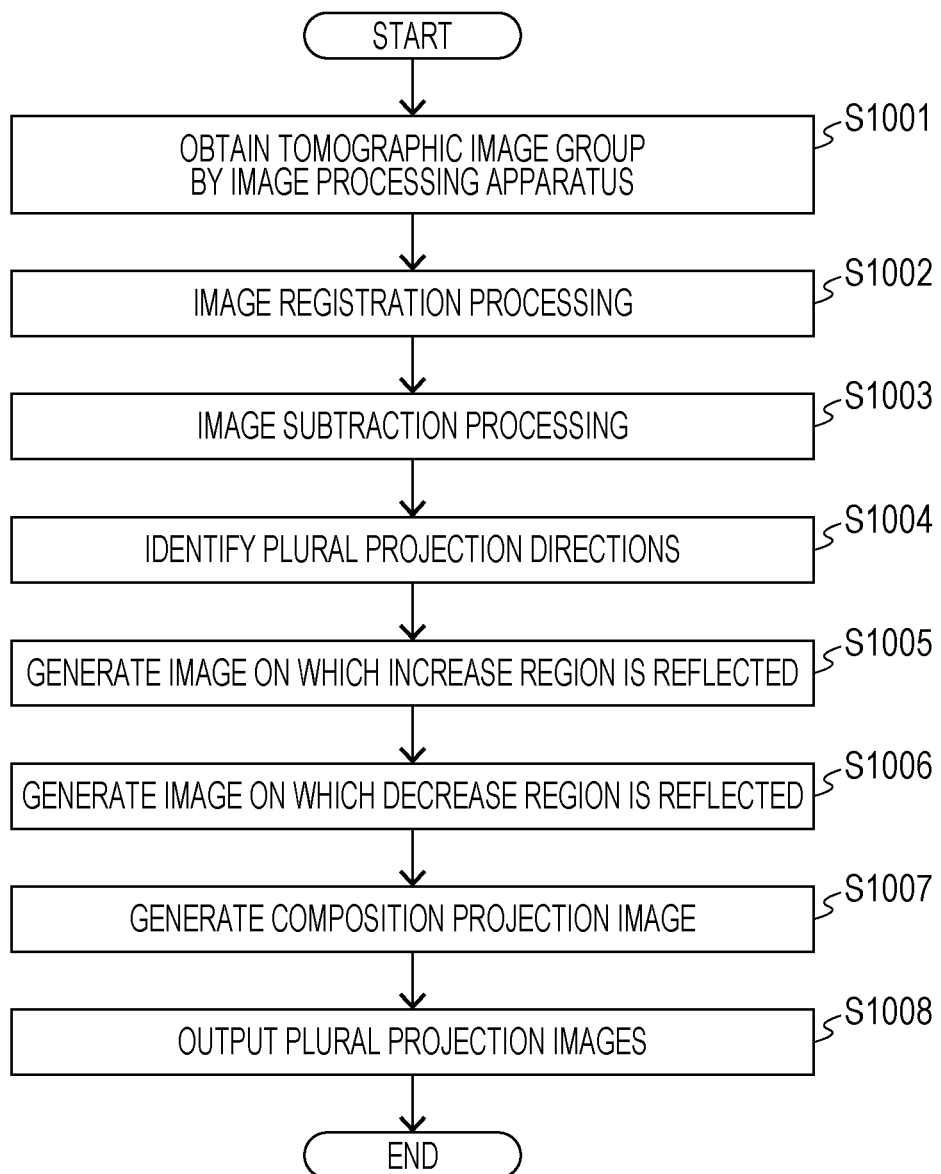
FIG. 10 is a flow chart illustrating an example of processing performed by the image processing apparatus according to the first exemplary embodiment.

Next, the processing in the image processing apparatus 50 according to the first exemplary embodiment will be described with reference to FIG. 10. In the image processing apparatus 50, the obtaining unit 51 obtains the plurality of tomographic images, and the generation unit 52 generates the temporal subtraction tomographic image and its projection image. Then, the output unit 53 outputs the projection image to the information processing apparatus 60. Furthermore, the generation unit 52 generates the tomographic plane image corresponding to the coordinates on the basis of information for specifying coordinates of an arbitrary pixel which is input from the information processing apparatus 60, and the output unit 53 outputs the tomographic plane image to the information processing apparatus 60. As a result, it is possible to generate and output the appropriate image for the comparison and the observation of the tomographic image. It should be noted that the output unit 53 may output the temporal subtraction tomographic image to the information processing apparatus 60. Hereinafter, a case where the two tomographic images obtained while the same site of the same object is imaged by the same medical image capturing apparatus 30 are compared with each other for the observation will be described as an example.

In step S1001, the obtaining unit 51 obtains at least two or more tomographic image groups desired to be compared with each other for the observation. Herein, the two tomographic images including the first tomographic image and the second tomographic image previously obtained by imaging the same object as the first tomographic image are obtained. The obtaining unit 51 obtains the tomographic image from the PACS 40 via the network 20. As an alternative to the above, the obtaining unit 51 obtains the tomographic image saved in the SSD 203 of the image processing apparatus 50. The obtaining unit 51 obtains the tomographic image in accordance with the operation input of the user. In another example, the obtaining unit 51 performs control such that the tomographic image is automatically transmitted to the image processing apparatus 50 when the PACS 40 saves the tomographic image. Furthermore, control may be performed such that the obtaining unit 51 automatically searches the PACS 40 for the previous tomographic image of the same object to be transmitted to the image processing apparatus 50. Similarly, the obtaining unit 51 performs control such that the tomographic image may be automatically output to the image processing apparatus 50 when the medical image capturing apparatus 30 captures the tomographic image.

In step S1002, the registration processing unit 521 performs the image registration processing on the two tomographic images obtained in step S101 to be deformed such that the two tomographic images are matched to each other as much as possible. Herein, it is assumed that the registration processing unit 521 deforms the second tomographic image to obtain a third tomographic image. That is, by the processing in step S1002, the third tomographic image in which the position relationship of the imaging targets is substantially matched with the first tomographic image is obtained. The output unit 53 outputs the third tomographic image generated by the registration processing unit 521 to the SSD 203 or the PACS 40 to be saved. For example, in a case where the processing illustrated in FIG. 10 is interrupted in step S1002, the obtaining unit 51 obtains the third tomographic image from the SSD 203 or the PACS 40, and the subsequent processing can be resumed.

In step S1003, the differential processing unit 522 performs the image subtraction processing using the first tomographic image and the third tomographic image to generate the temporal subtraction tomographic image.

In step S1004, the projection processing unit 523 identifies a plurality of projection directions. The projection direction can be defined by a view-up direction vector and a view direction vector in a three-dimensional Cartesian coordinate system (X, Y, Z). For example, in a case where a direction in which Axial images are laminated is set as a Z axis, the view-up direction vector perpendicular to the lamination direction of the tomographic plane images constituting the temporal subtraction tomographic image is represented as (X, Y, Z)=(0, 0, −1). The projection image is obtained by projecting all the pixels with the view direction vector at (X, Y, Z)=(−sin θ, −cos θ, 0) in which θ is set to be higher than or equal to 0 and lower than 2π (π denotes a circle ratio) while the view-up direction vector is maintained. In this example, when θ is 0, the projection image becomes a projection image in a Coronal image direction. When θ is π/2, the projection image becomes a projection image in a Sagittal direction. According to the first exemplary embodiment, the projection processing unit 523 generates a plurality of projection images by changing θ in the view direction vector at a constant interval. That is, when the projection images in the plurality of projection directions generated by the projection processing unit 523 are output to the display unit 61 of the information processing apparatus 60, the projection images can be displayed as video of rotation display.

Furthermore, in step S1004, the projection direction specified by the operation input of the user is identified. The operation input of the user is performed, for example, via the operation unit 62 of the information processing apparatus 60 and input to the image processing apparatus 50 by the specification unit 635 of the information processing apparatus 60. In addition, the projection direction can be previously set by the user. For example, in particular, the plurality of projection directions used when an input for specifying the projection direction does not exist are identified. When the input for specifying the projection direction exists, the specified projection direction is identified.

In step S1005, the projection processing unit 523 generates the projection image on which the region where the pixel value is increased is reflected. For example, the projection processing unit 523 generates the MIP image of the temporal subtraction tomographic image generated in step S1003. As a result, with regard to the plural pieces of three-dimensional image data obtained by imaging the object at the plurality of different time points, the projection image in accordance with the three-dimensional partial region where the pixel value is increased is obtained.

In step S1006, the projection processing unit 523 generates the projection image on which the region where the pixel value is decreased is reflected. For example, the projection processing unit 523 generates the MinIP image of the temporal subtraction tomographic image generated in step S1003. As a result, with regard to the plural pieces of three-dimensional image data obtained by imaging the object at the plurality of different time points, the projection image in accordance with the three-dimensional partial region where the pixel value is decreased is obtained.

In step S1005 and step S1006, by generating the projection image on which the region where the pixel value is increased or decreased is reflected, it is possible to obtain the image where the influence of artifact is reduced as compared with the temporal subtraction tomographic image. As a result, the user can more easily find out the part where the change occurs when the user observes the image.

It should be noted that, when the position relationship of the imaging targets of the first tomographic image and the third tomographic image completely match, the pixel value of the pixel other than the region where the change occurs in the temporal subtraction tomographic image generated in step S1003 becomes 0. In actuality, a misalignment may occur in some cases even when the image registration processing is performed. Therefore, in step S1005 and step S1006, when the projection image of the temporal subtraction tomographic image is generated, a rough shape may also be depicted in some cases in the region other than the region where the change occurs.

In step S1007, the composition processing unit 524 combines the projection images generated in step S1005 and step S1006 with each other. As a result, it is possible to obtain the image representing the change of the increase in the pixel value and the change of the decrease in the pixel value that can be observed at the same time. In step S1005 and S1006, when the MIP image and the MinIP image are generated from the same view direction, the images both having the same size, that is, the same number of pixels are generated. In step S1007, the projection image in which the pixel values of the mutual pixels at the same coordinate of the MIP image and the MinIP image obtained in step S1005 and step S1006 are added to each other is generated.

In step S1008, the output unit 53 outputs the plurality of projection images including the composition projection image which are generated in step S1004 to step S1007 to the information processing apparatus 60.

The output unit 53 may output the temporal subtraction tomographic image generated in step S1003 to the information processing apparatus 60 at a predetermined time point. The predetermined time point is, for example, step S1003. In another example, the predetermined time point is step S1008, and the temporal subtraction tomographic image is output to the information processing apparatus 60 together with the plurality of projection images including the composition projection image.

That is, the image processing apparatus 50 according to the first exemplary embodiment includes the obtaining unit 51 corresponding to an obtaining unit configured to obtain plural pieces of three-dimensional image data obtained by imaging an object at a plurality of different time points. In addition, the image processing apparatus 50 includes the generation unit 52 corresponding to a generation unit configured to generate, on the basis of the plural pieces of three-dimensional image data, a plurality of projection images obtained by projection from a plurality of different projection directions corresponding to projection images representing a three-dimensional partial region where a pixel value is increased and a three-dimensional partial region where the pixel value is decreased at a second time point with respect to a first time point among the plurality of time points. Furthermore, the image processing apparatus 50 includes the output unit 53 corresponding to an output unit configured to output the plurality of projection images to the outside to be displayed on the display unit.

Next, the processing in the information processing apparatus 60 according to the first exemplary embodiment will be described with reference to FIG. 11. In the information processing apparatus 60, the obtaining unit 633 obtains the projection image, and the display control unit 634 displays the projection image on the display unit 61. Then, the specification unit 635 specifies the projection direction. As a result, it is possible to generate and output the appropriate image for the comparison and the observation of the image. In a case where the temporal subtraction tomographic image is also output from the output unit 53, the information processing apparatus 60 can display the temporal subtraction tomographic image.

In step S1101, the information processing apparatus 60 accepts an input for instructing the image to be displayed on the display unit 61. For example, the information processing apparatus 60 accepts the operation input of the user for instructing the image to be displayed on the display unit 61 via the operation unit 62. The user can select and instructs the image to be displayed on the display unit 61 from the images saved in the SSD 203 of the information processing apparatus 60 or the PACS 40. As an alternative to the above, while information indicating that the image is captured by the medical image capturing apparatus 30 is input to the information processing apparatus 60, the input is accepted as the instruction for displaying this captured image.

In step S1102, the obtaining unit 633 obtains the projection image from the image processing apparatus 50.

In step S1103, the specification unit 635 specifies the projection direction. According to the first exemplary embodiment, the plurality of projection directions are specified for rotation display as an initial setting. In a case where the projection image corresponding to the specified projection direction is not obtained in step S1102, the specification unit 635 causes the obtaining unit 633 to obtain the projection image from the image processing apparatus 50.

Figure 12:
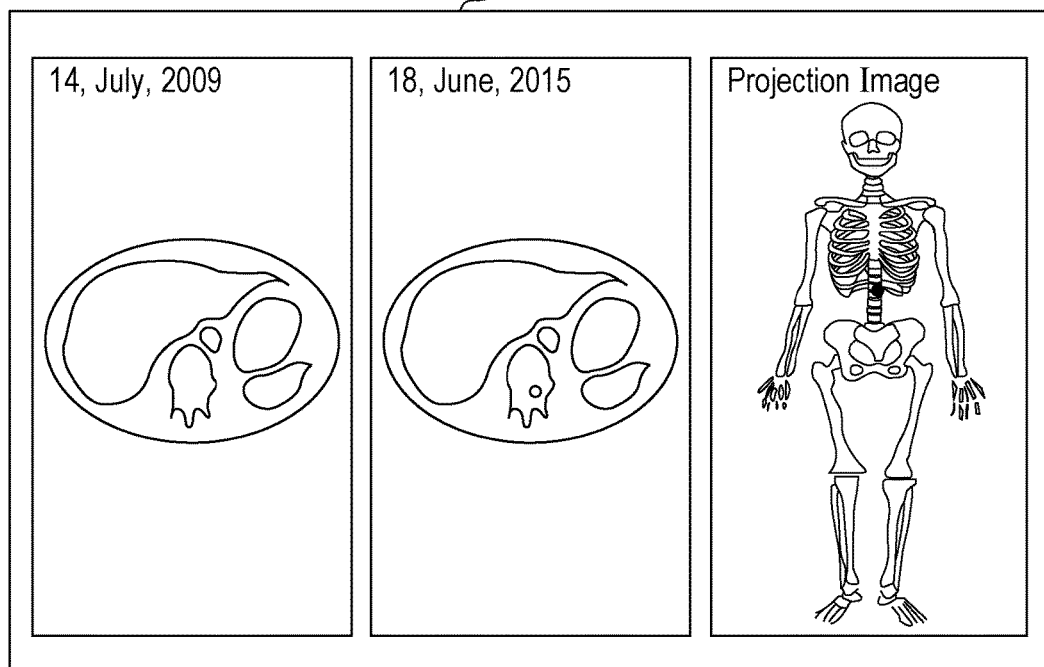
FIG. 12 illustrates an example of a screen displayed on a display unit of the information processing apparatus according to the first exemplary embodiment.

In step S1104, the display control unit 634 displays the projection images on the display unit 61. FIG. 12 illustrates an example of a screen displayed on the display unit 61 in step S1104. In FIG. 12, the projection images are displayed in a region represented as "Projection Image" on the right side. Herein, video of the rotation display is displayed. For example, with regard to the projection image of the temporal subtraction tomographic image of the CT image in which a whole body is imaged, the video of the display rotation is displayed where a rough shape of the object continues rotating in a horizontal direction in which a vertical direction of the screen is set as a rotation axis. In the example illustrated in FIG. 12, since the human body looks like rotating, the shape of the human body is easily grasped. Furthermore, in step S1102, the composition image generated in step S1007 as illustrated in FIG. 10 is obtained and displayed on the display unit 61. That is, the plurality of projection images are displayed on the display unit 61. As a result, it is facilitated to grasp in which position of the human body the region displayed to be emphasized as the region having the change exists.

In step S1105, the specification unit 635 determines whether or not the specification of the projection direction exists. When the projection direction is specified, the flow proceeds to step S1103. When the projection direction does not exist, the flow proceeds to step S1106. The user can specify the projection direction via the operation unit 62. According to the first exemplary embodiment, the video of the rotation display in which θ in the view direction vector is changed at a constant interval is displayed on the display unit 61 as the initial setting. In this case, for example, the specification unit 635 specifies θ at a time point when a mouse pointer indicating a specification position of a mouse as an example of the operation unit 62 is overlapped with the display part of the projection image as the projection direction. In step S1103, θ at the time point when the mouse pointer is overlapped is specified as the projection direction. In step S1104, the display control unit 634 displays the projection image corresponding to the specified projection direction on the display unit 61. As a result, at the time point when the mouse pointer is overlapped with the projection image, the rotation display is stopped. A region on the projection image may be clicked as an operation input for specifying the projection direction in a case where the rotation display is performed. The projection direction may also be specified by a wheel operation of the mouse or a key operation of the key board on the projection image. The user can adjust the position of the rotation display by operating the view direction vector of the projection image.

In addition, in step S1105, a type of the projection image displayed on the display unit 61 can be changed by the operation input of the user. For example, the user can display a desired projection image among the MIP image, the MinIP image, and the projection image obtained by combining the MIP image and the MinIP image with each other on the display unit 61. The information processing apparatus 60 may determine the projection image to be displayed on the display unit 61 in accordance with a purpose of capturing the tomographic image corresponding to the base of the projection image. For example, the display control unit 634 displays an appropriate projection image for detecting a lesion site related to a disease of the patient corresponding to the object on the display unit 61. When the lung cancer is suspected, the display control unit 634 displays the MIP image that can represent the region where the pixel value is increased on the display unit 61.

In step S1106, the information processing apparatus accepts an operation input for completing the display of the projection image on the display unit 61. For example, the operation input for completing the display is performed while an icon (not illustrated) displayed on the screen of the display unit 61 by the display control unit 634 is operated. When the operation input for completing the display exists, the display is completed. When the operation input for completing the display does not exist, the flow proceeds to step S1104, and the display of the projection image continues.

Figure 13:
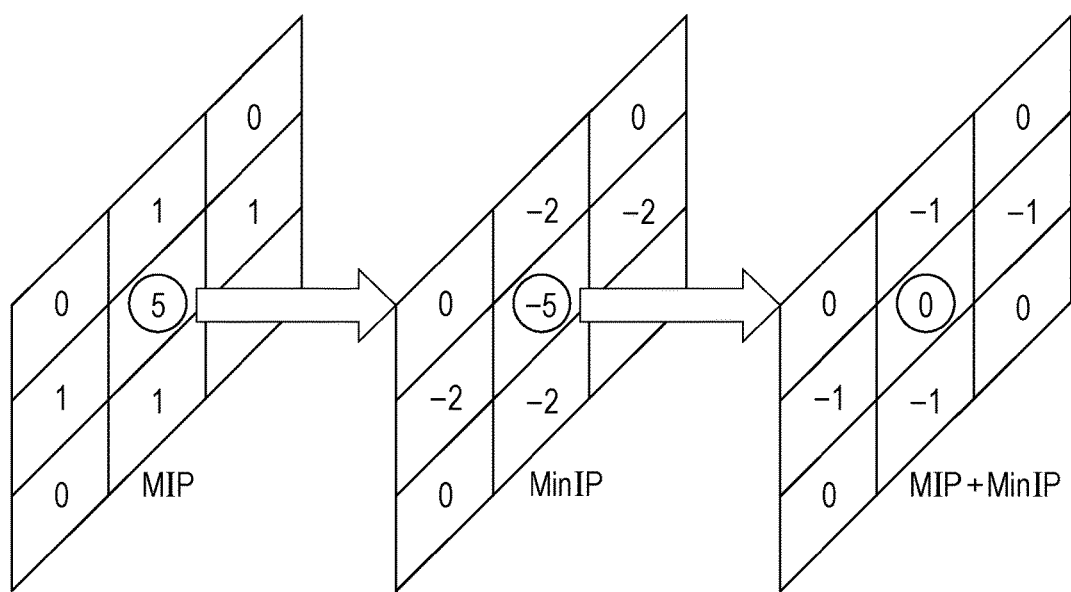
FIG. 13 illustrates an example of the projection processing according to the first exemplary embodiment.

A case is conceivable where, with regard to the projection image obtained by combining the MIP image and the MinIP image with each other, the regions emphasized in the respective images are displayed to be overlapped in a certain projection direction. For example, the case includes a case where the positive value recorded in the MIP image and the negative value recorded in the MinIP image are overlapped with each other when the change in which the pixel value is increased and the change in which the pixel value is decreased occur on the same view straight line in a certain region as illustrated in FIG. 13. At this time, the pixel values may be cancelled out during the addition process for combining the MIP image with the MinIP image, and the pixel value may be close to 0 in the composition image in some cases. Even when a change occurs in the tomographic image group desired to be compared, there is a fear that a feature is not depicted in the projection image. In the processing in step S1102 to step S1104, for example, the projection images in the plurality of projection directions are displayed as in the rotation display, so that it is possible to display the projection image from which the overlap of the emphasized regions is eliminated. The user can more accurately find out the region where the change occurs. In addition, for example, as in the rotation display, by switching the view direction of the projection image to be displayed, it is possible to alleviate labor for the user to manually switch the view direction.

The information processing apparatus 60 according to the first exemplary embodiment includes the obtaining unit 633 corresponding to an obtaining unit configured to obtain, on the basis of plural pieces of three-dimensional image data obtained by imaging an object at a plurality of different time points, a plurality of projection images obtained by projection from a plurality of different projection directions corresponding to projection images in accordance with a three-dimensional partial region where a pixel value is increased and a three-dimensional partial region where the pixel value is decreased at a second time point with respect to a first time point among the plurality of time points. In addition, the information processing apparatus includes the display control unit 634 corresponding to a display control unit configured to display the plurality of projection images on a display unit.

That is, the information processing apparatus 60 according to the first exemplary embodiment can three-dimensionally present the change between the two or more tomographic image groups in a manner that the user can easily grasp the change. The three-dimensional partial region where the change occurs can be displayed such that the influence of the artifact is reduced. As a result, the user can more easily find out the three-dimensional partial region where the change occurs. In particular, the region where the change occurs can be easily found out by the projection image display of the temporal subtraction tomographic image, and the possibility that the lesion is overlooked can be reduced. In addition, the labor for visually searching for the lesion site can be alleviated.

Second Exemplary Embodiment

Next, a second exemplary embodiment of the present invention will be described. According to the first exemplary embodiment, an example has been described in which the maximum value projection processing or the minimum value projection processing is performed in the projection processing. The information processing apparatus according to the second exemplary embodiment obtains information of the region display corresponding to information regarding the region where the pixel value is increased or decreased by an amount higher than or equal to a threshold or the region where a size is changed by an amount higher than or equal to a threshold with regard to the plural pieces of three-dimensional image data captured at the different time points.

FIG. 14 is a flow chart for exemplifying the processing in the image processing apparatus 50 according to the second exemplary embodiment. Since step S1001 to step S1004 illustrated in FIG. 14 are similar to step S1001 to step S1004 illustrated in FIG. 10, the above-described explanation is equally applicable, and the detailed description will be omitted.

In step S1401, the projection processing unit 523 obtains the region where the size is changed by the amount higher than or equal to the threshold and the region where the pixel value is changed by the amount higher than or equal to the threshold among the regions included in the temporal subtraction tomographic image. The threshold can be previously set by the user. In addition, the threshold can be set in accordance with a purpose of an examination for capturing a medical image. Herein, the size refers to the number of voxels or the volume in the case of the three-dimensional image data. Information with regard to the region obtained in step S1401 will be hereinafter referred to as region information. The region information is considered to be useful to distinguish the region where the temporal change of the lesion region occurs from the other artifact. For example, when a certain cancer region is enlarged over the temporal change, it is conceivable that the region is changed so as to be expanded as a whole and distinguished from the artifact. In addition, when the cancer region is generated, the change in the pixel value of the region is considered to be larger than that of the region where the artifact is generated.

In step S1402, the projection processing unit 523 generates a plurality of projection images. The processing in step S1402 is similar to the processing in step S1004 to step S1007 illustrated in FIG. 10.

In step S1403, the output unit 53 outputs the region information obtained in step S1401 and the plurality of projection images generated in step S1402 to the information processing apparatus 60.

As a result, similarly as in the first exemplary embodiment, it is possible to generate the projection image in which the number of artifacts is low while the region where the change occurs is emphasized.

FIG. 15 is a flow chart for exemplifying the processing in the information processing apparatus 60 according to the second exemplary embodiment. Since step S1101 to step S1106 illustrated in FIG. 15 are similar to step S1101 to step S1106 illustrated in FIG. 11, the above-described explanation is equally applicable, and the detailed description will be omitted. In the processing of the information processing apparatus 60 that will be described below, the projection image generated in the image processing apparatus 50 by the processing illustrated in FIG. 14 is used. The processing of the information processing apparatus 60 illustrated in FIG. 15 may be applied to the projection image generated in the image processing apparatus 50 according to the first exemplary embodiment.

In step S1501, the display control unit 634 superimposes and displays the region display. First, the obtaining unit 633 obtains the region information obtained in step S1401 illustrated in FIG. 14. The display control unit 634 superimposes and displays the display of the region indicated by the region information on the projection image displayed on the display unit 61 in step S1104. For example, the region where the temporal change occurs is displayed to be emphasized by the MIP image or the MinIP image.

In step S1502, the display control unit 634 determines whether or not the region display superimposed and displayed in step S1501 is overlapped in the projection image displayed in step S1104 from the projection direction specified in step S1103. It is conceivable that the region on which the region display is superposed is a region on which the user desires to pay attention such as a cancer region. For example, as illustrated in FIG. 13, the regions emphasized in both the MIP image and the MinIP image may be overlapped with each other in a certain projection direction in some cases. Furthermore, in a case where the region emphasized in the MIP image or the MinIP image is overlapped with the region that is superposed with the region display, it is conceivable that the region on which the user desires to pay attention is overlapped in a certain projection direction. In a case where the region on which the user desires to pay attention is overlapped with the projection image displayed in step S1104, there is a fear that only one of them may be depicted, or the pixel values are cancelled out and are not depicted as a result of the composition of the MIP image and the MinIP image. Thus, there is a fear that the region on which the user desires to pay attention may be overlooked. In step S1502, in a case where the display control unit 634 determines that the overlap occurs, the flow proceeds to step S1503. In a case where the display control unit 634 determines that the overlap does not occur, the flow proceeds to step S1105.

In step S1503, the display control unit 634 displays an alert "overlapped" on the screen of the display unit 61. As a result, it is possible to reduce the probability that the user overlooks the region on which the user desires to pay attention in the projection image displayed on the display unit 61. When the display control unit 634 displays the alert, the flow proceeds to step S1105.

Figure 11:
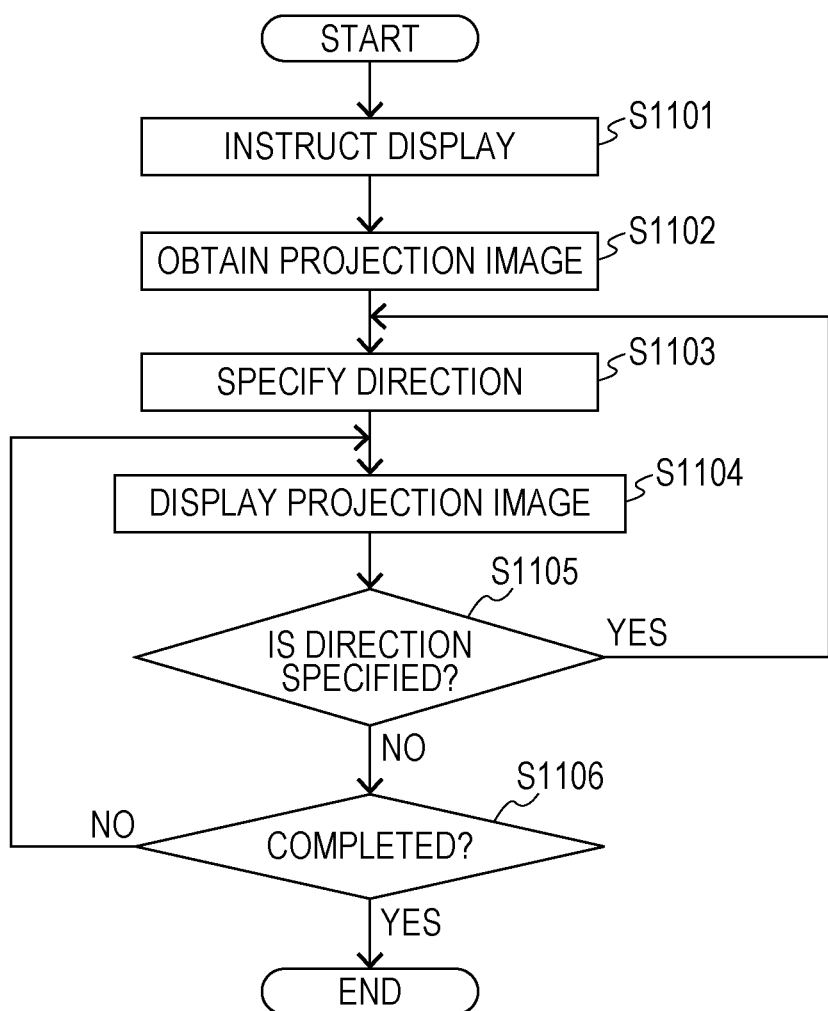
FIG. 11 is a flow chart illustrating an example of the processing performed by the information processing apparatus according to the first exemplary embodiment.

Since step S1105 and step S1106 illustrated in FIG. 15 are similar processing as step S1105 and step S1106 illustrated in FIG. 11, the above-described explanation is equally applicable, and the detailed description will be omitted.

In this manner, by the information processing apparatus according to the second exemplary embodiment, the region on which the user desires to pay attention among the regions where the temporal change occurs in the three-dimensional image data captured at the different time points can be displayed in a more easily understandable manner. As a result, the probability that the region on which the user desires to pay attention is overlooked is reduced.

MODIFIED EXAMPLES

Next, a modified example of the first exemplary embodiment and the second exemplary embodiment will be described. FIG. 12 exemplifies the screen on which the projection image is displayed by the display unit 61, but the display control unit 634 may also display the tomographic image or the tomographic plane image related to the projection image at the same time. For example, FIG. 12 displays the tomographic plane images at the position corresponding to the emphasized area in the "Projection Image", that is, the region where the temporal change occurs, in a chronological order from the left. When the user specifies the position on the projection image via the operation unit 62, the display control unit 634 can also display the tomographic plane images corresponding to the specified position. Specifically, the projection image is a two-dimensional image, and a Y coordinate corresponding to the vertical direction of the pixel group constituting the projection image is equivalent to a Z coordinate of the tomographic image group corresponding to a generation source of the projection image. For this reason, when coordinates corresponding to the display part of the projection image are specified, the Y coordinate in the projection image and the Z coordinate in the above-described tomographic image group are identified. The display control unit 634 can display the tomographic plane image that passes through the identified Z coordinate of the first tomographic image or the tomographic plane image that passes through the above-described Z coordinate of the third tomographic image or display both of the images on the display unit 61. When the user discovers a region where a lesion may exist, the user often observes the tomographic plane image at the same time. In the above-described case, it is possible to alleviate the labor for switching the projection image and the tomographic plane image or searching for the tomographic plane image at a position corresponding to the lesion. That is, when the user uses the mouse to click part displayed to be thickened up on the projection image based on the MIP image, for example, the screen can be instantly switched to the tomographic plane image where such a change occurs that the pixel value is increased to be observed. Thus, the labor for the switching operation of the tomographic plane image in the related art is alleviated.

As another modified example of the first exemplary embodiment and the second exemplary embodiment, the display control unit 634 displays a plurality of tomographic plane images at the same time on the display unit 61 or switches the plurality of tomographic plane images to be displayed on the display unit 61. In the tomographic image group such as the first tomographic image, the second tomographic image, the third tomographic image, and the temporal subtraction tomographic image, the tomographic plane images (for example, Axial images or the like) constituting the above-described images are displayed in general. The display control unit 634 displays the tomographic plane images reconstituted to other tomographic plane of Coronal images, Sagittal images, or the like at the same time or switches the tomographic plane images to be displayed on the display unit 61 together with the Axial images. Processing is performed such that the position relationship of the imaging targets of the first tomographic image and the third tomographic image is substantially matched by the image registration processing. In a case where a display operation is performed on one of the tomographic images, a similar display operation is applied to the other tomographic image, so that the tomographic plane images at the same position in both the tomographic images can be displayed while being synchronized with each other. Furthermore, when a display operation with respect to a certain tomographic plane image is converted to a display operation with respect to another tomographic plane image to be applied, it is possible to display the other tomographic plane images while being synchronized with each other or instantly switch the tomographic plane images to be displayed. That is, when the tomographic plane image including the lesion in the previous tomographic image is displayed, the tomographic plane image including the position where the lesion in the new tomographic image exists is automatically synchronized and displayed. As a result, the user can easily check the change of the lesion, and the labor for the switching operation of the tomographic plane image is alleviated. In addition, with regard to the projection image at the same position, it is possible to change a display condition such as a type of the projection image or the view direction by the operation of the user. Each time the display condition is changed, the information processing apparatus 60 outputs the display condition to the image processing apparatus 50. The image processing apparatus 50 generates the projection image corresponding to the temporal subtraction tomographic image corresponding to the input the display condition to be output to the information processing apparatus 60.

The present invention can also be realized by processing in a manner that a program for realizing one or more functions of the above-described exemplary embodiments is supplied to a system or an apparatus via a network or a storage medium, and one or more processors in a computer of the system or the apparatus read out the program to execute the processing. In addition, the present invention can be realized by a circuit that realizes one or more functions (for example, an application specific integrated circuit (ASIC)).

The information processing apparatus according to the above-described respective exemplary embodiments may be realized as a stand-alone apparatus, and a mode in which a plurality of apparatuses are combined with each other so as to be mutually communicable to execute the above-described processing may also be adopted, which are both included in the exemplary embodiments of the present invention. A common server apparatus or a server group may also execute the above-described processing. It is sufficient when a plurality of apparatuses constituting the information processing apparatus and an information processing system are communicable to each other at a predetermined communication rate, and the plurality of apparatuses do not necessarily need to exist in the same facility or the same country.

The exemplary embodiments of the present invention include a mode in which a program of software for realizing the above-described functions of the exemplary embodiments is supplied to a system or an apparatus, and a computer of the system or the apparatus reads out and executes a code of the supplied program.

Therefore, to realize the processing according to the exemplary embodiment by the computer, the program code itself installed into the computer is also one of the exemplary embodiments of the present invention. In addition, an operation system (OS) or the like running on the computer performs part or all of the actual processing on the basis of an instruction included in the program read out by the computer, and the above-described functions of the exemplary embodiments may also be realized by the processing.

A mode in which the above-described exemplary embodiments are combined with each other is also included in the exemplary embodiments of the present invention.

According to the exemplary embodiments of the present invention, while the projection image in accordance with the region where the change occurs between the three-dimensional image data captured at the different time points is displayed, the region where the clinical condition is changed can be presented in an easily understandable manner. In addition, while the plurality of projection images projected from the plurality of different projection directions are displayed, the region overlapped in a certain projection direction can be displayed in the projection image from another projection direction. Thus, it is possible to reduce the probability that the user overlooks the region where the clinical condition is changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-171258, filed Aug. 31, 2015, which is hereby incorporated by reference herein in its entirety.

What is claimed is:

1. An information processing apparatus comprising:
an obtaining unit configured to obtain, on a basis of plural pieces of three-dimensional image data obtained by imaging an object at a plurality of different time points, a plurality of projection images obtained by projection from a plurality of different projection directions corresponding to projection images in accordance with a three-dimensional partial region where a pixel value is increased and a three-dimensional partial region where the pixel value is decreased at a second time point with respect to a first time point among the plurality of time points;
a display control unit configured to display the plurality of projection images on a display unit; and
a specification unit configured to specify a projection direction,
wherein the display control unit displays the projection image obtained by projection in the specified projection direction on the display unit.

2. The information processing apparatus according to claim 1,
wherein the display control unit switches and displays the plurality of projection images on the display unit while the projection direction is changed.

3. The information processing apparatus according to claim 1,
wherein the display control unit switches and displays the plurality of projection images such that the projection direction rotates.

4. The information processing apparatus according to claim 1,
wherein the projection image obtained by the obtaining unit is a projection image obtained on a basis of a subtraction image based on the three-dimensional image data obtained by imaging at the first time point and the three-dimensional image data obtained by imaging at the second time point.

5. The information processing apparatus according to claim 4,
wherein the projection image obtained by the obtaining unit is a projection image obtained by combining a maximum value projection image obtained by performing maximum value projection processing on the subtraction image with a minimum value projection image obtained by performing minimum value projection processing on the subtraction image.

6. The information processing apparatus according to claim 5,
wherein the plurality of projection images include a projection image obtained by combining a first maximum value projection image and a first minimum value projection image with each other which are obtained by performing the maximum value projection processing and the minimum value projection processing on the subtraction image in a first direction, and a projection image obtained by combining a second maximum value projection image and a second minimum value projection image with each other which are obtained by performing the maximum value projection processing and the minimum value projection processing on the subtraction image in a second direction.

7. The information processing apparatus according to claim 4,
wherein the display control unit displays at least one of the plural pieces of three-dimensional image data and the subtraction image together with the projection image.

8. The information processing apparatus according to claim 1,
wherein the projection image obtained by the obtaining unit is a projection image obtained on a basis of the three-dimensional image data obtained by deforming at least one of the three-dimensional image data obtained by imaging at the first time point and the three-dimensional image data obtained by imaging at the second time point to perform registration of the three-dimensional image data obtained by imaging at the first time point and the three-dimensional image data obtained by imaging at the second time point.

9. The information processing apparatus according to claim 1,
wherein, in one of the obtained projection images, in a case where at least either a region where the pixel value is increased or decreased by an amount higher than or equal to a threshold, or a region having a size larger than or equal to a threshold among regions included in the three-dimensional image data, is overlapped as viewed from the projection direction of the one projection image, the display control unit displays information indicating an overlap situation on the display unit together with the one projection image.

10. The information processing apparatus according to claim 1,
wherein the three-dimensional image data is a plurality of tomographic images of the object.

11. An information processing apparatus comprising:
an obtaining unit configured to obtain plural pieces of three-dimensional image data obtained by imaging an object at different time points;
a generation unit configured to generate, on a basis of the plural pieces of three-dimensional image data, a plurality of projection images obtained by projection in a plurality of different projection directions corresponding to projection images in accordance with a three-dimensional partial region where a pixel value is increased and a three-dimensional partial region where the pixel value is decreased at a second time point with respect to a first time point among the plurality of time points;
an output unit configured to output the plurality of projection images to an outside to be displayed on a display unit; and
a specification unit configured to specify a projection direction,
wherein the output unit outputs the projection image obtained by projection in the specified projection direction to the outside.

12. The information processing apparatus according to claim 11,
wherein the generation unit generates a subtraction image based on the three-dimensional image data obtained by imaging at the first time point and the three-dimensional image data obtained by imaging at the second time point, and generates the projection image on a basis of the subtraction image, and
wherein the output unit outputs the subtraction image to the outside.

13. An information processing method comprising:
obtaining, on the basis of plural pieces of three-dimensional image data obtained by imaging an object at a plurality of different time points, a plurality of projection images obtained by projection from a plurality of different projection directions corresponding to projection images in accordance with a three-dimensional partial region where a pixel value is increased and a three-dimensional partial region where the pixel value is decreased at a second time point with respect to a first time point among the plurality of time points;
displaying the plurality of projection images on a display unit; and
specifying a projection direction,
wherein the displaying displays the projection image obtained by projection in the specified projection direction on the display unit.

14. An information processing method comprising:
obtaining plural pieces of three-dimensional image data obtained by imaging an object at different time points;
generating, on a basis of the plural pieces of three-dimensional image data, a plurality of projection images obtained by projection from a plurality of different projection directions corresponding to projection images in accordance with a three-dimensional partial region where a pixel value is increased and a three-dimensional partial region where the pixel value is decreased at a second time point with respect to a first time point among the plurality of time points;
outputting the plurality of projection images to an outside to be displayed on a display unit; and
specifying a projection direction,
wherein the outputting outputs the projection image obtained by projection in the specified projection direction to the outside.

15. A non-transitory recording medium storing a program that when executed on a computer causes the computer to execute a process comprising
obtaining processing for obtaining, on a basis of plural pieces of three-dimensional image data obtained by imaging an object at a plurality of different time points, a plurality of projection images obtained by projection from a plurality of different projection directions corresponding to projection images in accordance with a three-dimensional partial region where a pixel value is increased and a three-dimensional partial region where the pixel value is decreased at a second time point with respect to a first time point among the plurality of time points,
displaying processing for displaying the plurality of projection images on a display unit; and
specifying processing for specifying a projection direction,
wherein the displaying processing displays the projection image obtained by projection in the specified projection direction on the display unit.

16. A non-transitory recording medium storing a program that when executed on a computer causes the computer to execute a process comprising
obtaining processing for obtaining plural pieces of three-dimensional image data obtained by imaging an object at different time points,
generation processing for generating, on the basis of the plural pieces of three-dimensional image data, a plurality of projection images obtained by projection from a plurality of different project directions corresponding to projection images in accordance with a three-dimensional partial region where a pixel value is increased and a three-dimensional partial region where the pixel value is decreased at a second time point with respect to a first time point among the plurality of time points,
output processing for outputting the plurality of projection images to an outside to be displayed on a display unit; and
specifying processing for specifying a projection direction,
wherein the output processing outputs the projection image obtained by projection in the specified projection direction to the outside.

* * * * *